Patented Aug. 30, 1927.

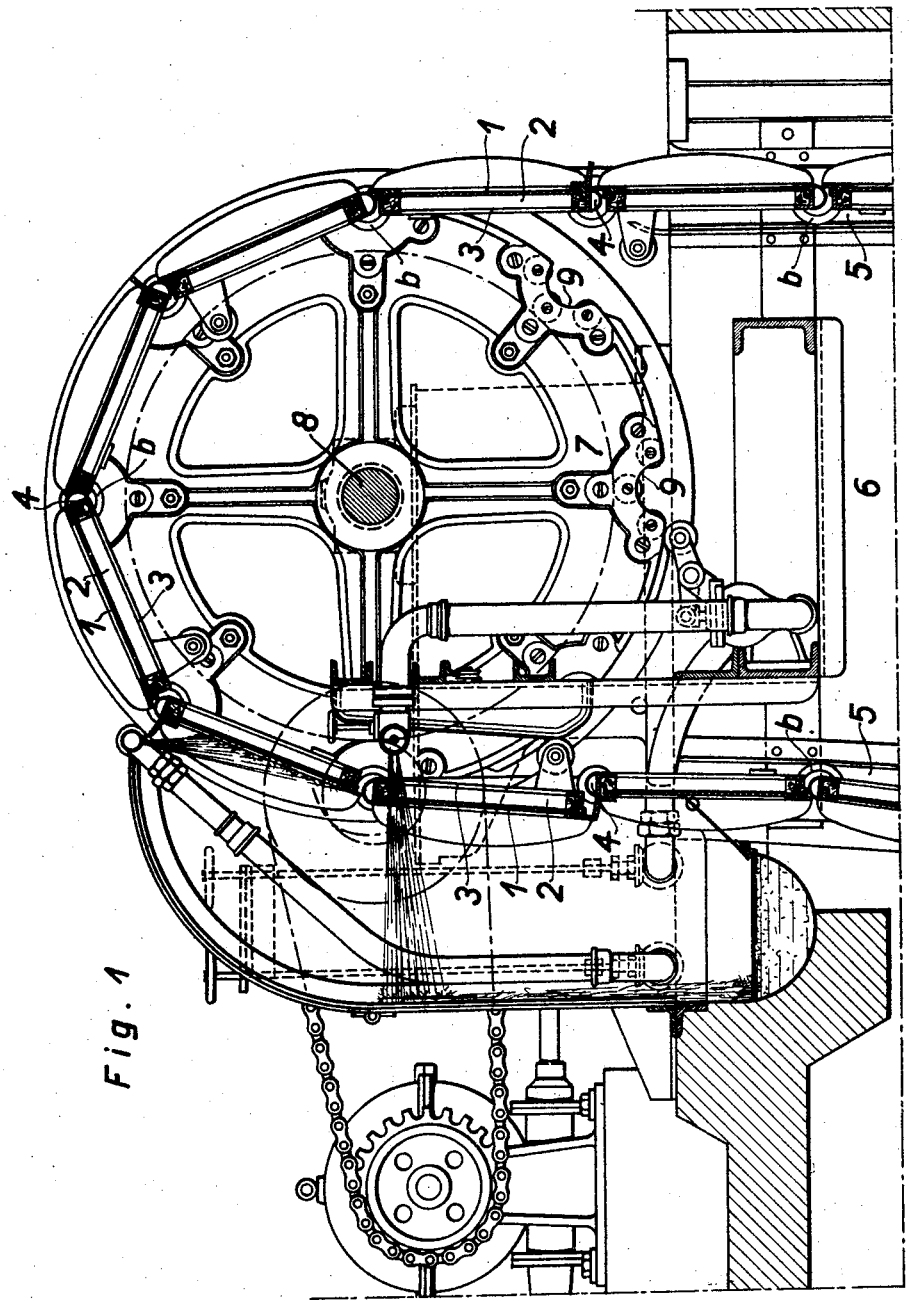

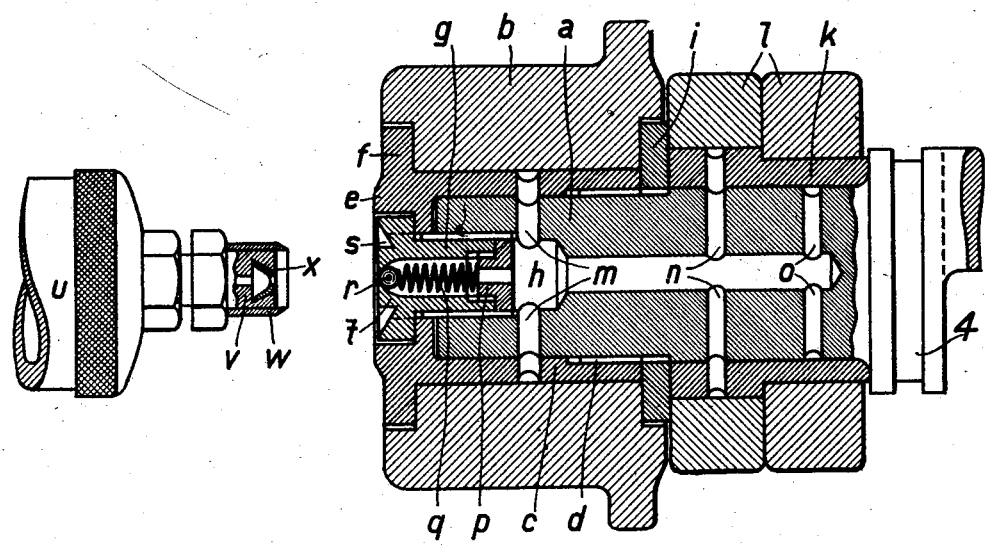

1,640,653

UNITED STATES PATENT OFFICE.

EUGEN GEIGER, OF KARLSRUHE, GERMANY.

ROTATING ENDLESS-SCREEN BELT FOR THE MECHANICAL PURIFICATION OF WATER.

Application filed March 25, 1926, Serial No. 97,394, and in Germany April 2, 1925.

My invention relates to screens for mechanically purifying river or waste water, which are in the form of an endless belt composed of a number of sections of screen held in frames and rotated by two endless chains which are disposed one at each side, and which are guided in two U-shaped rails mounted on the side walls of the water channel by means of rollers that are mounted on pins formed by the ends of the bolts connecting the chain links, the chains being driven above the water by two wheels mounted upon a common shaft and provided with teeth engaged by the rollers which run over them.

The mounting of the guide rollers upon their bearing pins must be both simple and secure. The spaces between the contact faces of the rollers and the bearing pins must be well closed up to prevent dirt penetrating. Wear must be reduced to a minimum and confined to a few parts that can be easily and quickly replaced. These conditions are satisfied by mounting each of the rollers upon a bush, which is screwed at its inner part upon the bearing pin and prevented from working loose. A fixed flange at the outer end of the bush and a collar or ring screwed on to the bearing pin between the inner end of the bush and an enlarged part of the bearing pin, prevent the roller from moving outwardly and inwardly and also close up the spaces between the contact faces of the roller and the bush, and the collar or ring referred to also prevents the chain links that are mounted upon the enlarged part of the bearing pin from displacement outwardly.

The screw which in order to prevent the bush from working loose is passed through a hole in the end of the bush and screwed into an axial bore in the bearing pin, is according to my invention formed as a non-return valve and provided at its head with a boss upon which may be applied the nozzle of a grease gun. By this means it is possible very rapidly and safely to lubricate the rollers and the links sufficiently. It is merely necessary to place the nozzle of the grease gun upon the boss of the safety screw, and to remove it after the lubricant has been forced in. Thus it is not necessary to withdraw the safety screw and then to insert the grease gun and, after the forcing in of the lubricant, to reverse the operations by withdrawing the grease gun and replacing the safety screw. These operations would involve such a waste of time in their being carried out that the screen belt would require to remain stationary until the many rollers were thoroughly lubricated.

In the accompanying drawings Fig. 1 shows the upper part of an endless screen belt in vertical section with one of the two upper chain wheels in side elevation, and Fig. 2 shows in longitudinal section a form of construction of the guiding rollers and the bearing pins.

The endless screen belt, Fig. 1, is composed of a number of screen sections 1 which are held in frames 2. These frames are carried by two endless chains 3 which are disposed on both sides of the belt. The links of these chains are connected together by horizontal bolts 4 both ends of which form a bearing pin $a$ and carry a roller $b$. The chains 3 are by means of these rollers guided in two U-shaped rails 5 mounted on the side walls 6 of the water channel and are driven above the water by two wheels 7 mounted upon a common shaft 8 and provided with a number of peripheral gaps or notches 9 engaged by the rollers $b$ running over them As shown in Fig. 2 a bronze bush $c$ having thick walls is mounted upon the outer part of the bearing pin $a$ of the roller $b$, and its bore is screw-threaded at the inner end at $d$, and is closed at the outer end by an inwardly extending flange $e$. At the outer end the bush is also provided with an outwardly extending flange $f$. This bush is firmly screwed upon the screw-threaded inner part of the pin $a$ and is prevented from working loose by a round headed screw $g$ which passes through an axial hole formed by the flange $e$ and is screwed into an axial bore $h$ in the pin *a*. The head of this screw is counter-sunk to lie upon the flange *e*. Loosely mounted upon the larger inner part of the pin *a* and separated from the bush *c* by a ring *i*, which is also screwed upon the outer part of the pin *a*, is a second bronze bush *k*, upon which the outer one of the two chain links *l* is loosely mounted, whilst the inner link is fixedly mounted thereon.

The bore *h* is also used for lubricating the contact faces of the roller *b*, the bush *c*, the outer link *l*, the bush *k* and the pin *a*, the bore *h* being in communication with the spaces between these contact faces by transverse passages *m*, *n* and *o*. The screw *g* is provided with an axial bore partially closed at the inner end by a perforated screw threaded plug *p*. The said bore contains a helical spring *q* and a small steel ball *r* which is pressed by said spring into the restricted outer end of said bore and thus closes the latter outwardly. Furthermore, the screw *g* is provided at the outer face of its head with an outwardly inclined annular groove *s* forming a plain cylindrical boss *t*.

In order to lubricate the guide roller *b*, the bush *k* and the chain links *l*, it is only necessary to place the nozzle *v* of the grease gun *u* upon the boss *t*, whereby the sleeve *w* mounted upon the nozzle fits exactly with its protruding tapered edge upon the boss *t* and within the annular groove *s*. If now the piston of the grease gun *u* is advanced by screwing, the lubricant passing out through the nozzle *v* tightly presses the leather cap *x* against the end face of the boss *t*. The leather cap is mounted in a conical recess within the nozzle and is provided with a central hole; by these means the space between the end face of the boss *t* and that of the nozzle is closed, so that the lubricant cannot escape at the sides, but presses back the ball *r* and escapes through the bores in the parts *g* and *p*, through the bore *h*, and through the passages *m*, *n* and *o* into position between the faces to be lubricated. When removing the grease gun the bore in the screw *g* is automatically closed by the ball *r* under the pressure of the spring *q*.

In this way all guide rollers and chain links of the screen belt may be positively and thoroughly lubricated without danger during working and in a short space of time. The screw *g* may be easily withdrawn for the purpose of cleaning the passages for the lubricant or for replacement with the valve ball and the spring.

What I claim as my invention and desire to secure by Letters Patent is:

1. In a rotating endless screen belt for the mechanical purification of water, being composed of a number of screen sections, in combination with a number of frames holding said screen sections, two endless chains carrying said frames on both sides, bolts connecting together the links of said chains, guiding rollers carried by the ends of said bolts, each of said ends forming a bearing pin, a bush closed at its outer end and mounted upon said bearing pin, one of said rollers being loosely mounted upon said bush, means for preventing said roller from moving outwardly and inwardly, an axial bore in said pin, transverse passages in said pin and said bush connecting said axial bore with the spaces between the contact faces of said bush and said roller, a headed screw passing through the closed end of said bush and engaging with the outer end of said axial bore, an axial bore in said screw communicating with that in said pin, and means contained in said screw for automatically closing said bore therein outwardly under spring pressure and automatically opening inwardly under outer pressure.

2. In a rotating endless screen belt for the mechanical purification of water, being composed of a number of screen sections, in combination with a number of frames holding said screen sections, two endless chains carrying said frames on both sides, bolts connecting together the links of said chains, guiding rollers carried by the ends of said bolts, each of said ends forming a bearing pin, a bush closed at its outer end and mounted upon said bearing pin, one of said rollers being loosely mounted upon said bush, means for preventing said roller from moving outwardly and inwardly, an axial bore in said pin, transverse passages in said pin and said bush connecting said axial bore with the spaces between the contact faces of said bush and said roller, a headed screw passing through the closed end of said bush and engaging with the outer end of said axial bore, an axial bore in said screw communicating with that in said pin, means contained in said screw for automatically closing said bore therein outwardly under spring pressure and automatically opening inwardly under outer pressure, and a cylindrical boss provided at the outer face of the head of said screw.

3. In a rotating endless screen belt for the mechanical purification of water, being composed of a number of screen sections, in combination with a number of frames holding said screen sections, two endless chains carrying said frames on both sides, bolts connecting together the links of said chains, guiding rollers carried by the ends of said bolts, each of said ends forming a bearing pin, a bush closed at its outer end and mounted upon said bearing pin, one of said rollers being loosely mounted upon said bush, means for preventing said roller from moving outwardly and inwardly, an axial bore in said pin, transverse passages in said pin and said bush connecting said axial bore with the spaces between the contact faces of said bush and said roller, a headed screw passing through the closed end of said bush and engaging with the outer end of said axial bore, an axial bore in said screw communicating with that in said pin, and having a restricted outer end, a perforated screw threaded plug partially closing the inner end of the bore in said screw, a ball contained in this bore, and a spring also contained therein and pressing said ball into said restricted outer end thereof.

4. In a rotating endless screen belt for the mechanical purification of water, being composed of a number of screen sections, in combination with a number of frames holding said screen sections, two endless chains carrying said frames on both sides, bolts connecting together the links of said chains, guiding rollers carried by the ends of said bolts, each of said ends forming a bearing pin having a threaded outer part and an enlarged inner part, a bush closed at its outer end and mounted upon the outer part of said bearing pin, an outwardly extending flange at the outer end of said bush, a ring screwed upon the outer part of said pin between the inner part of the same and said bush, one of said rollers being loosely mounted upon said bush between said flange and said ring, an axial bore in said pin, transverse passages in said pin and said bush connecting said axial bore with the spaces between the contact faces of said bush and said roller, a headed screw passing through the closed outer end of said bush and engaging with the outer end of said axial bore, an axial bore in said screw communicating with that in said pin, and means contained in said screw for automatically closing said bore therein outwardly under spring pressure and automatically opening inwardly under outer pressure.

5. In a rotating endless screen belt for the mechanical purification of water, being composed of a number of screen sections, in combination with a number of frames holding said screen sections, two endless chains carrying said frames on both sides, bolts connecting together the links of said chains, guiding rollers carried by the ends of said bolts, each of said ends forming a bearing pin having a screw-threaded outer part and an enlarged inner part, a bush closed at its outer end and mounted upon the outer part of said bearing pin, an outwardly extending flange at the outer end of said bush, a ring screwed upon the outer part of said pin between the inner part of the same and said bush, one of said rollers being loosely mounted upon said bush between said flange and said ring, an axial bore in said pin, transverse passages in said pin and said bush connecting said axial bore with the spaces between the contact faces of said bush and said roller, a headed screw passing through the closed outer end of said bush and engaging with the outer end of said axial bore, an axial bore in said screw communicating with that in said pin, and having a restricted outer end, a perforated screw threaded plug partially closing the inner end of the bore in said screw, a ball contained in this bore, and a spring also contained therein and pressing said ball into said restricted outer end thereof.

6. In a rotating endless screen belt for the mechanical purification of water, being composed of a number of screen sections, in combination with a number of frames holding said screen sections, two endless chains carrying said frames on both sides, bolts connecting together the links of said chains, guiding rollers carried by the ends of said bolts, each of said ends forming a bearing pin having a screw-threaded outer part and an enlarged inner part, a bush mounted upon the outer part of said bearing pin, an inwardly and an outwardly extending flange at the outer end of said bush, a ring screwed upon the outer part of said pin between the inner part of the same and said bush, one of said rollers being loosely mounted upon said bush between said outwardly extending flange and said ring, an axial bore in said pin, transverse passages in said pin and said bush connecting said axial bore with the spaces between the contact faces of said bush and said roller, a headed screw passing through said inwardly extending flange and screwed into said axial bore, the head of said screw being counter-sunk to lie upon said inwardly extending flange, an axial bore in said screw communicating with that in said pin, and means contained in said screw for automatically closing said bore therein outwardly under spring pressure and automatically opening inwardly under outer pressure.

7. In a rotating endless screen belt for the mechanical purification of water, being composed of a number of screen sections, in combination with a number of frames holding said screen sections, two endless chains carrying said frames on both sides, bolts connecting together the links of said chains, guiding rollers carried by the ends of said bolts, each of said ends forming a bearing pin having a screw-threaded outer part and an enlarged inner part, a bush mounted upon the outer part of said bearing pin, an inwardly and an outwardly extending flange at the outer end of said bush, a ring screwed upon the outer part of said pin between the inner part of the same and said bush, one of said rollers being loosely mounted upon said bush between said outwardly extending flange and said ring, an axial bore in said pin, transverse passages in said pin and said bush connecting said axial bore with the spaces between the contact faces of said bush and said roller, a headed screw passing through said inwardly extending flange and screwed into said axial bore, the head of said screw being counter-sunk to lie upon said inwardly extending flange, an axial bore in said screw communicating with that in said pin and having a restricted outer end, a perforated screw threaded plug partially closing the inner end of the bore in said screw, a ball contained in this bore, a spring also contained therein and pressing said ball into said restricted outer end thereof, and a cylindrical boss provided at the outer face of the head of said screw.

In testimony whereof I affix my signature.

Dr. EUGEN GEIGER.